US011886139B2

(12) United States Patent

Shiokawa et al.

(10) Patent No.: US 11,886,139 B2
(45) Date of Patent: Jan. 30, 2024

(54) IMAGE FORMING APPARATUS THAT REDUCES UNCESSARY TOUCH FROM USER

(71) Applicant: FUJIFILM Business Innovation Corp., Tokyo (JP)

(72) Inventors: Yuya Shiokawa, Kanagawa (JP); Daisuke Ishihara, Kanagawa (JP); Kohei Tachibana, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/540,238

(22) Filed: Dec. 2, 2021

(65) Prior Publication Data

US 2023/0057365 A1 Feb. 23, 2023

(30) Foreign Application Priority Data

Aug. 23, 2021 (JP) ................................ 2021-135291

(51) Int. Cl.
*G03G 15/00* (2006.01)

(52) U.S. Cl.
CPC ................................ *G03G 15/5016* (2013.01)

(58) Field of Classification Search
CPC ................................................. G03G 15/5016
See application file for complete search history.

(56) References Cited

FOREIGN PATENT DOCUMENTS

| | | | | |
|---|---|---|---|---|
| JP | 2010109817 A | * | 5/2010 | |
| JP | 2015132714 A | * | 7/2015 | ......... G03G 15/6552 |
| JP | 6136503 | | 5/2017 | |

OTHER PUBLICATIONS

JP_2010109817_A_I MachineTranslation, Japan, 2010, Otsuka.*
JP_2015132714_A_I MachineTranslation, Japan, 2015, Ota et al.*

* cited by examiner

*Primary Examiner* — Victor Verbitsky
(74) *Attorney, Agent, or Firm* — JCIPRNET

(57) ABSTRACT

An image forming apparatus includes a placing portion onto which a recording medium having an image formed is to be placed, and an opening-closing member that covers an opening provided at least at one side face of the placing portion and automatically opens the opening with a predetermined timing.

18 Claims, 10 Drawing Sheets

IMAGE FORMING APPARATUS THAT REDUCES UNCESSARY TOUCH FROM USER

CROSS-REFERENCE TO RELATED APPLICATIONS

This application is based on and claims priority under 35 USC 119 from Japanese Patent Application No. 2021-135291 filed Aug. 23, 2021.

BACKGROUND

(i) Technical Field

The present disclosure relates to an image forming apparatus.

(ii) Related Art

There are several known technologies relating to an image forming apparatus, such as the one disclosed by Japanese Patent No. 6136503.

Japanese Patent No. 6136503 relates to an exterior structure intended for an image forming apparatus. The image forming apparatus includes a sheet stacking portion that is closed to the outside at the rear face and at a rear part of the upper face but is open to the outside at the front face, at a front part of the upper face, and at one side face. The exterior structure includes an exterior covering that covers the sheet stacking portion such that the front face and the front part of the upper face are closed, with the side face being left open. The exterior covering has a cut in an upper-front part thereof near the one side face of the sheet stacking portion.

SUMMARY

If a placing portion onto which recording media are to be placed has a constantly open side face, users may unnecessarily touch the placing portion even though, for example, no image forming operation is underway in the image forming apparatus and there are no recording media on the placing portion.

Aspects of non-limiting embodiments of the present disclosure relate to reducing the probability that users may unnecessarily touch a placing portion on which recording media are to be placed, compared with the probability in the case of a placing portion having a constantly open side face.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a placing portion onto which a recording medium having an image formed is to be placed, and an opening-closing member that covers an opening provided at least at one side face of the placing portion and automatically opens the opening with a predetermined timing.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
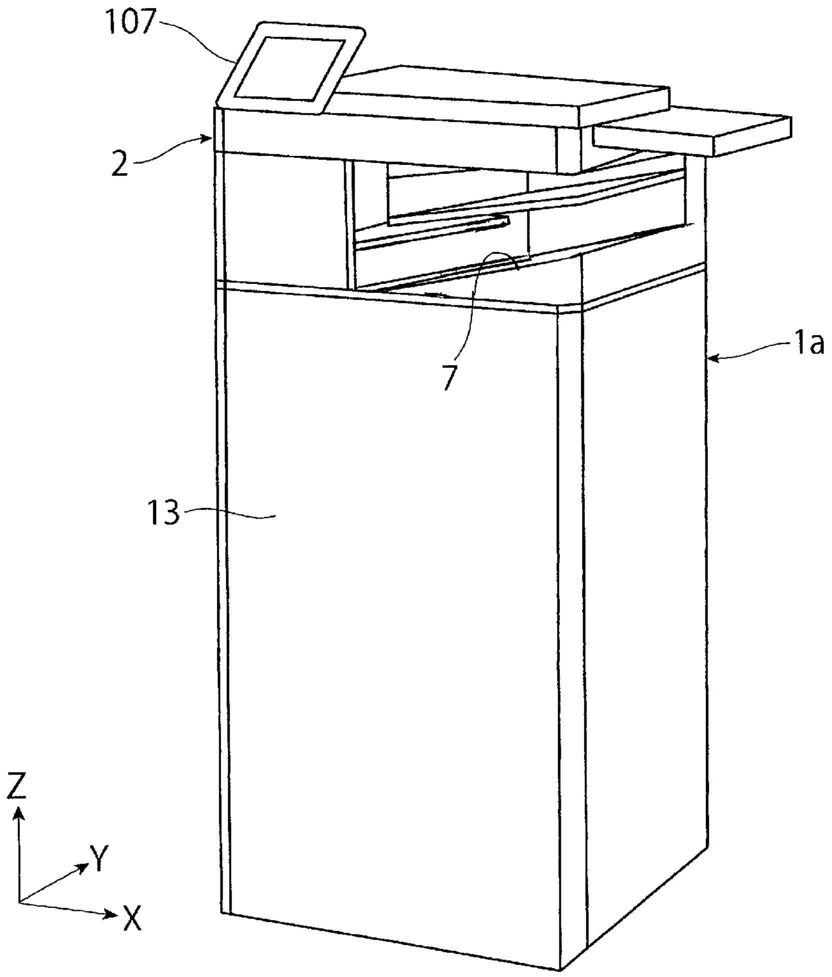
FIG. 1 is a perspective view of an image forming apparatus according to a first exemplary embodiment of the present disclosure, illustrating the appearance thereof.

FIG. 1 is a perspective view of an image forming apparatus 1 according to a first exemplary embodiment of the present disclosure, illustrating the appearance thereof. Referring to FIG. 1, the arrow X represents the horizontal direction (width direction) of the image forming apparatus 1, the arrow Y represents the depth direction of the image forming apparatus 1, and the arrow Z represents the vertical direction (top-bottom direction) of the image forming apparatus 1.

Overall Configuration of Image Forming Apparatus

The image forming apparatus 1 according to the first exemplary embodiment is configured as, for example, a color printer. As illustrated in FIG. 1, the image forming apparatus 1 includes an apparatus body 1*a*, which has a substantially cubic box shape with a larger length in the vertical direction Z than in the width direction X and the depth direction Y. The image forming apparatus 1 includes an image reading device 2. The image reading device 2 is provided on the top of the apparatus body 1*a* and reads the image of a document. The image forming apparatus 1 forms an image on a recording sheet 5 (see FIG. 2) with reference to information on the image of the document read by the image reading device 2 or information on any image transmitted thereto through a communication line (not illustrated). The recording sheet is an exemplary recording medium. As illustrated in FIG. 1, the image forming apparatus 1 includes a user interface 107, which is an exemplary operation unit through which users operate the image forming apparatus 1. The user interface 107 is a liquid-crystal touch panel or the like.

Figure 2:
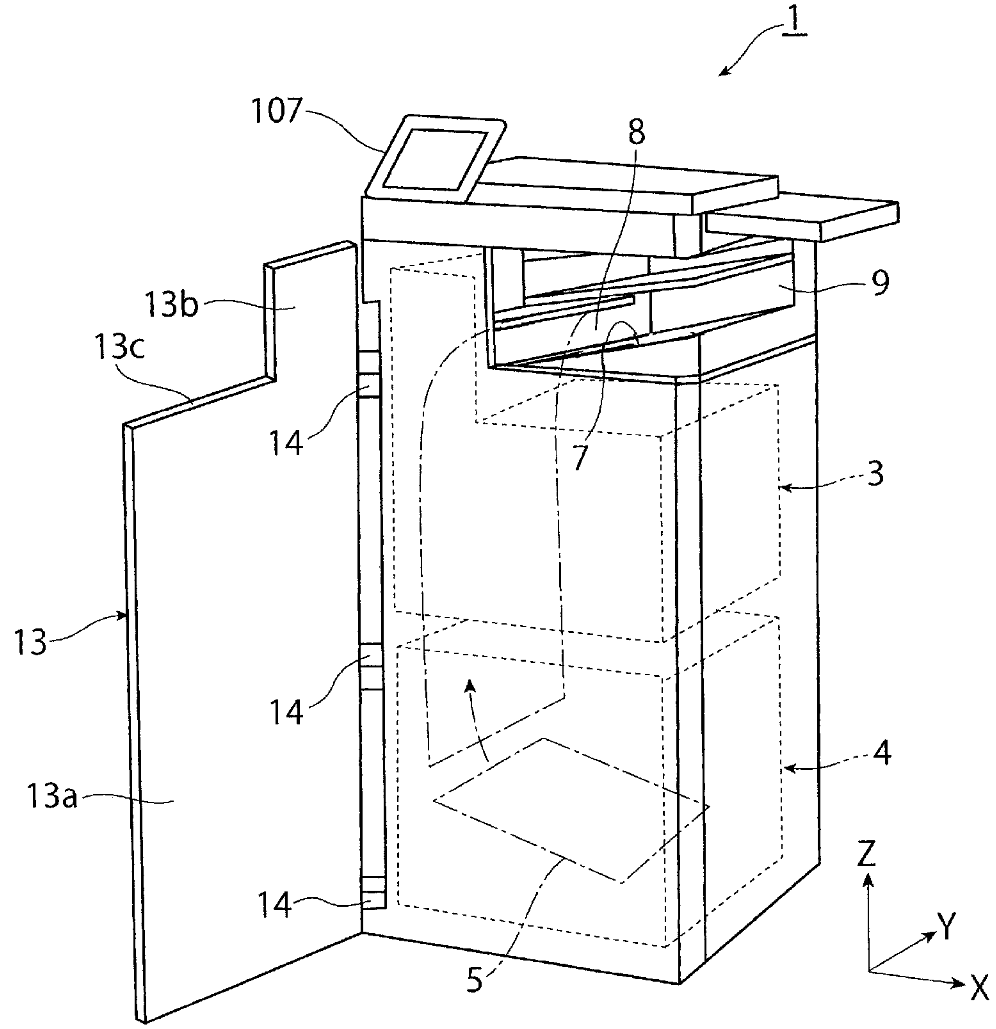
FIG. 2 is another perspective view of the image forming apparatus according to the first exemplary embodiment of the present disclosure, with a front covering thereof being open.

Referring to FIG. 2, the image forming apparatus 1 includes an image forming section 3, a sheet feeding section 4, and so forth, which are provided in the apparatus body 1*a*. The image forming section 3 includes a plurality of imaging devices, an intermediate transfer device, and so forth. The imaging devices form respective toner images in yellow (Y), magenta (M), cyan (C), and black (K) by an electrophotographic method or the like. The intermediate transfer device receives the toner images formed by the plurality of imaging devices and transports the toner images to a second-transfer position. The sheet feeding section 4 feeds recording sheets 5 one by one to the image forming section 3.

Figure 3:
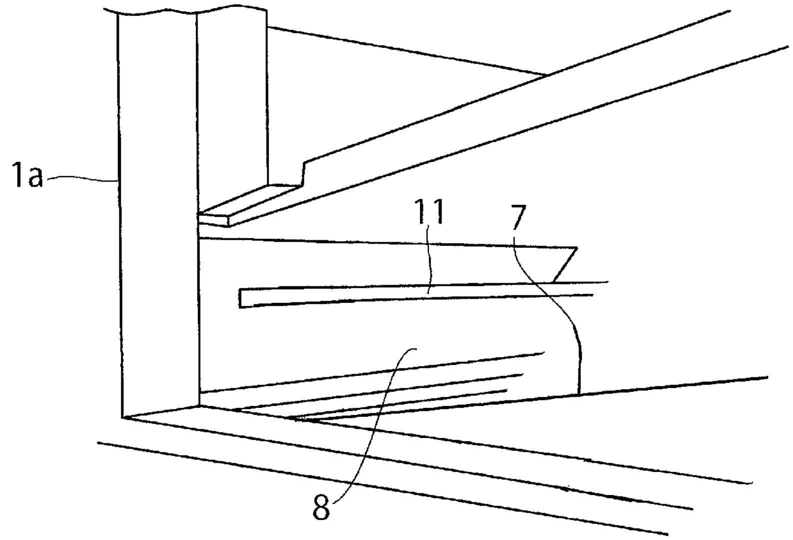
FIG. 3 is a perspective view of a sheet placing tray included in the image forming apparatus according to the first exemplary embodiment of the present disclosure.

Referring to FIGS. 2 and 3, the apparatus body 1*a* of the image forming apparatus 1 includes a sheet placing tray 7 at the top thereof. The sheet placing tray 7 is an exemplary placing portion onto which a recording sheet 5 having an image formed thereon is to be placed. The sheet placing tray 7 inclines upward in the vertical direction Z while extending toward the downstream side in an output direction, in which the recording sheet 5 is outputted. The recording sheet 5 outputted onto the sheet placing tray 7 moves under its own weight along the inclined sheet placing tray 7 toward the proximal end (the left end in FIG. 2), in the output direction, of the sheet placing tray 7 and is aligned at the proximal end. The sheet placing tray 7 is formed as an in-frame placing portion provided between the image reading device 2 and the apparatus body 1*a*. The sheet placing tray 7 has an opening 8 at the front face (on the side where the user operates the image forming apparatus 1) in the depth direction Y, and an opening 9 at one side face (on the right side in FIG. 2) in the width direction X. The sheet placing tray 7 formed as an in-frame placing portion does not project from any of the side faces of the apparatus body 1*a*. Referring to FIG. 3, the recording sheet 5 having an image formed thereon is outputted from an outlet 11.

Figure 4:
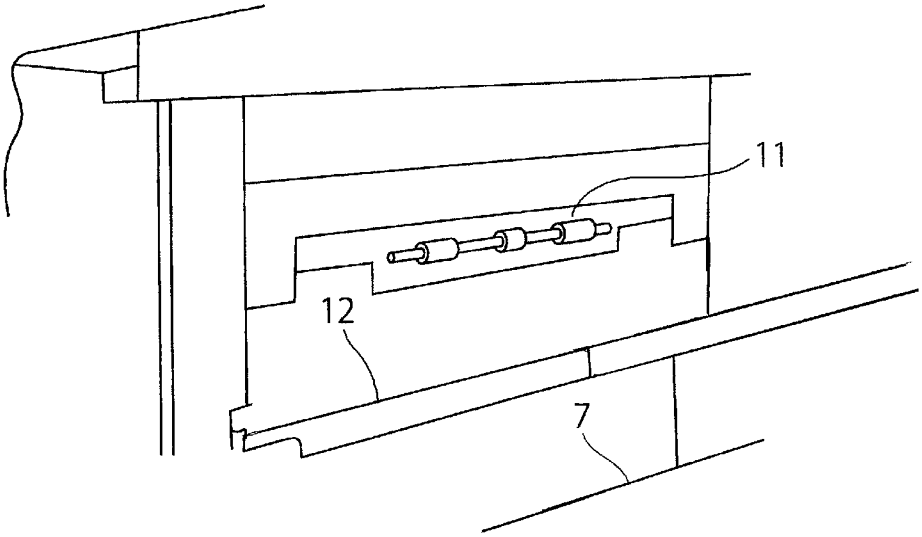
FIG. 4 is a perspective view of a modification of the sheet placing tray included in the image forming apparatus.

Referring to FIG. 3, the recording sheet 5 placed on the sheet placing tray 7 is picked up by the user with his/her hands inserted into the opening 8 provided at the front face of the apparatus body 1*a*. The sheet placing tray 7 is not limited to a single type, as illustrated in FIG. 3, integrated with the top panel of the apparatus body 1*a* and may be a double type, as illustrated in FIG. 4, including the sheet placing tray 7 as a lower tray and a sheet placing tray 12 as an upper tray. The sheet placing tray 12 has a flat plate shape and inclines upward in the vertical direction Z while extending toward the downstream side in the output direction.

Referring to FIG. 1, the image forming apparatus 1 includes a front covering 13 at the front face thereof. The front covering 13 is an exemplary covering that openably covers the front face of the apparatus body 1*a*. As illustrated in FIG. 2, the front covering 13 is openably attached to the apparatus body 1*a* with hinges 14, which are provided at the inner left end, in the width direction X, of the apparatus body 1*a*. The front covering 13 has a flat plate shape conforming to the shape of the front face of the apparatus body 1*a*. Two opposite ends of the front covering 13 in the width direction X are curved toward the rear side.

The front covering 13 includes a first covering portion 13*a* and a second covering portion 13*b*, which are continuous with each other. The first covering portion 13*a* is positioned on the lower side in the vertical direction Z with respect to the sheet placing tray 7 of the apparatus body 1*a* and has a relatively large, substantially rectangular front-view shape spreading substantially over the entirety of the front face of the apparatus body 1*a*. The second covering portion 13*b* is positioned on one side (the left side in FIG. 2) in the width direction X with respect to the sheet placing tray 7 of the apparatus body 1*a* and has a relatively small, substantially rectangular front-view shape. The front covering 13 has a cut 13*c* at the top of the first covering portion 13*a* in the vertical direction Z. The cut 13*c* has a shape conforming to the front-view shape of the opening 8 of the sheet placing tray 7. As illustrated in FIG. 1, the front covering 13 is an integral member having a shape conforming to the front face of the apparatus body 1*a*, which provides a simple, fine front design of the apparatus body 1*a*.

When the front covering 13 is opened as illustrated in FIG. 2, the image forming section 3, the sheet feeding section 4, and other elements such as toner cartridges (not illustrated) provided in the apparatus body 1*a* of the image forming apparatus 1 are exposed. With the front covering 13 being open, maintenance work of the image forming apparatus 1, such as replacement of the toner cartridges or refilling of recording sheets 5 into the sheet feeding section 4, is performed.

The image forming apparatus 1 according to the first exemplary embodiment includes a liftable covering 15. The liftable covering 15 is an exemplary opening-closing member that covers the opening 8 provided at least at one side face, specifically the front face, of the sheet placing tray 7 and automatically opens the opening 8 with a predetermined timing.

Figure 5:
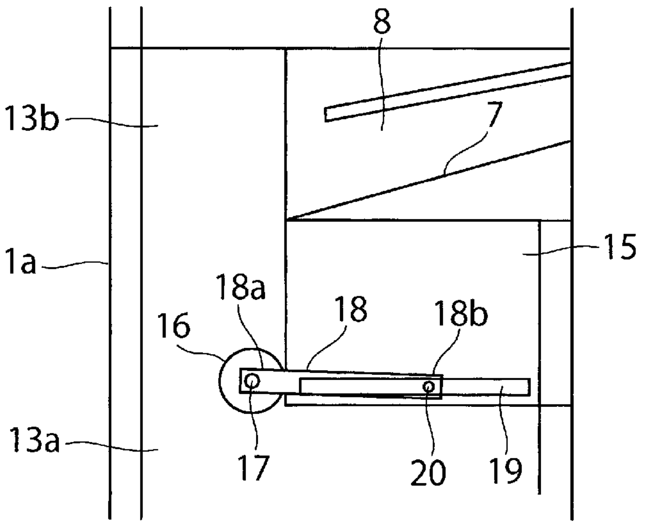
FIG. 5 illustrates relevant elements of the image forming apparatus according to the first exemplary embodiment of the present disclosure.

Referring to FIG. 5, in the image forming apparatus 1, the liftable covering 15 is provided at the upper end of the first covering portion 13*a* of the front covering 13 and inside or at the back of the front covering 13. The liftable covering 15 has a flat plate shape substantially conforming to the shape of the opening 8 provided at the sheet placing tray 7 of the image forming apparatus 1. The right side end of the liftable covering 15 in the width direction X is curved toward the rear side, conforming to the right side end of the front covering 13. The liftable covering 15 is supported at two opposite ends thereof in the width direction X in such a manner as to be movable up and down along guiding members (not illustrated) such as guide rails or guide grooves.

Figure 6:
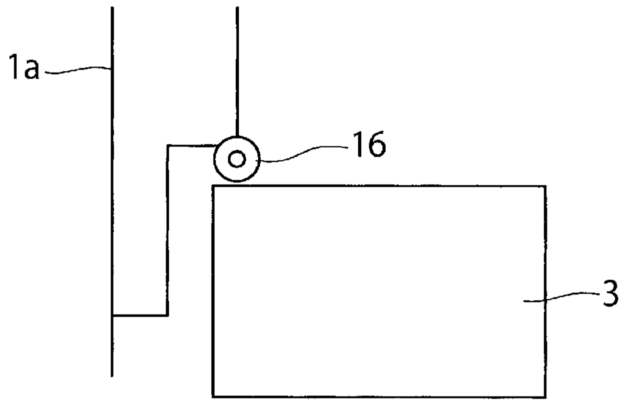
FIG. 6 is a front view of a part of the image forming apparatus according to the first exemplary embodiment of the present disclosure, with the front covering thereof being open.

Referring to FIGS. 5 and 6, the liftable covering 15 is driven by a driving motor 16. The driving motor 16 is an exemplary drive source provided to the apparatus body 1*a* of the image forming apparatus 1. The driving motor 16 is fixed inside the apparatus body 1*a* at a position near one side (the left side in FIG. 6) of the image forming section 3 in the width direction X. The driving motor 16 is, for example, a motor including a speed reducer. In the driving motor 16, the rotation speed of a motor (not illustrated) is reduced at a predetermined reduction ratio, whereby a drive shaft 17 is rotated at the reduced speed. The driving motor 16 is provided to the apparatus body 1*a*, not to the front covering 13. The driving force of the driving motor 16 is transmitted to the liftable covering 15 through a link 18, which is an exemplary link mechanism. The link 18 is attached to the front covering 13. Since the link 18 is attached to the front covering 13, increased accessibility to the apparatus body 1*a* of the image forming apparatus 1 is provided when the front covering 13 is open. The driving force of the driving motor 16 is transmitted to the link 18 through a driving-force-transmitting member such as a coupling (not illustrated).

The liftable covering 15 moves up and down at the back of the front covering 13, not at the front of the front covering 13. If, for example, a display is provided on the far side of the apparatus body 1*a* in the depth direction Y, the body of a user who is operating the display may touch the apparatus body 1*a*.

A first end 18*a* of the link 18 is fixedly connected to the driving shaft 17 of the driving motor 16. The link 18 rotates when the driving shaft 17 of the driving motor 16 rotates. A second end 18*b* of the link 18 is connected to a slide groove 19. The slide groove 19 is provided at the lower end of the liftable covering 15 and extends horizontally. A rod 20 is rotatably held at the second end 18*b* of the link 18 and is fitted in the slide groove 19 in such a manner as to be movable along the slide groove 19.

The link 18 serves as a lifting member that moves the liftable covering 15 up and down when driven by the driving motor 16. The lifting member is not limited to the link 18 and may be any other member such as a rack-and-pinion gear provided on one side, in the width direction X, of the liftable covering 15.

Figure 7:
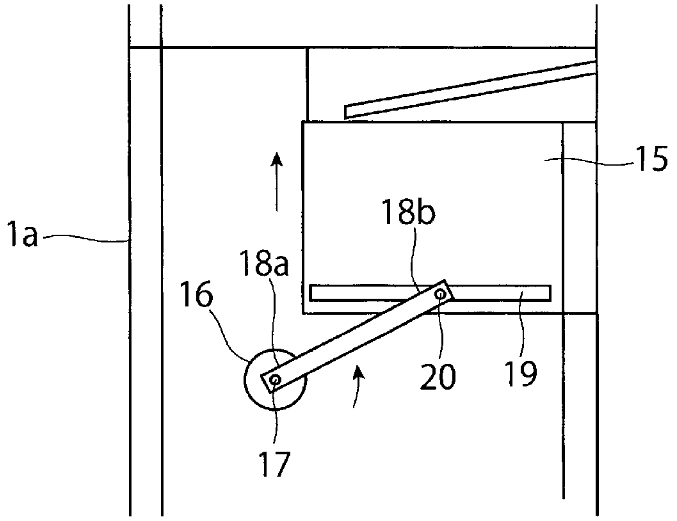
FIG. 7 illustrates how relevant elements of the image forming apparatus according to the first exemplary embodiment of the present disclosure work in front view.
Figure 8:
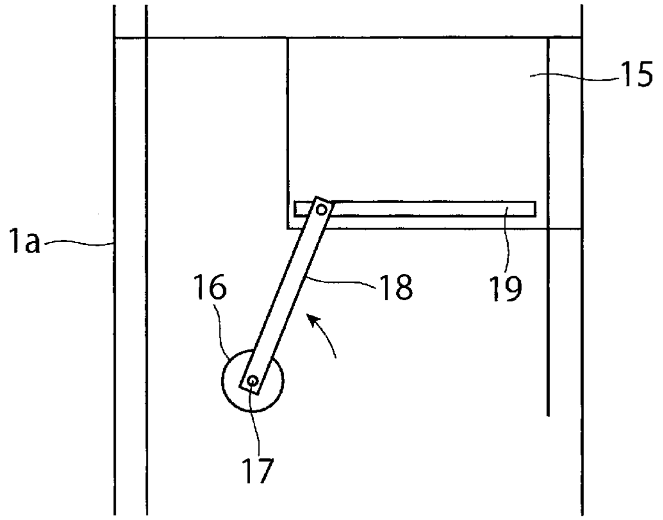
FIG. 8 illustrates how the relevant elements of the image forming apparatus according to the first exemplary embodiment of the present disclosure work in front view.
Figure 9:
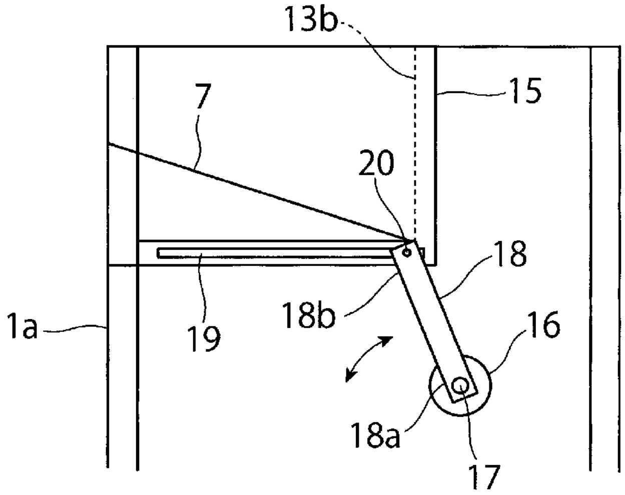
FIG. 9 illustrates how the relevant elements of the image forming apparatus according to the first exemplary embodiment of the present disclosure work in rear view.

Referring to FIGS. 7 to 9, the liftable covering 15 operates as follows. When the driving motor 16 is activated to cause the driving shaft 17 to rotate counterclockwise, the link 18 is rotated counterclockwise. With the counterclockwise rotation of the link 18, the second end 18*b* of the link 18 moves toward the upper left side in FIGS. 7 and 8, whereby the liftable covering 15 to which the second end 18*b* of the link 18 is connected moves upward. The liftable covering 15 thus moved stops at a position where the liftable covering 15 fully covers the opening 8 of the sheet placing tray 7. FIG. 9 is a rear view of relevant elements provided behind the front covering 13.

On the other hand, referring to FIGS. 7 to 9, when the driving motor 16 is activated to cause the driving shaft 17 to rotate clockwise, the link 18 is rotated clockwise. With the clockwise rotation of the link 18, the liftable covering 15 to which the second end 18*b* of the link 18 is connected moves downward. The liftable covering 15 thus moved is housed into or behind the first covering portion 13*a* of the front covering 13 and stops at a position where the entirety of the opening 8 of the sheet placing tray 7 is exposed.

Controller

Figure 10:
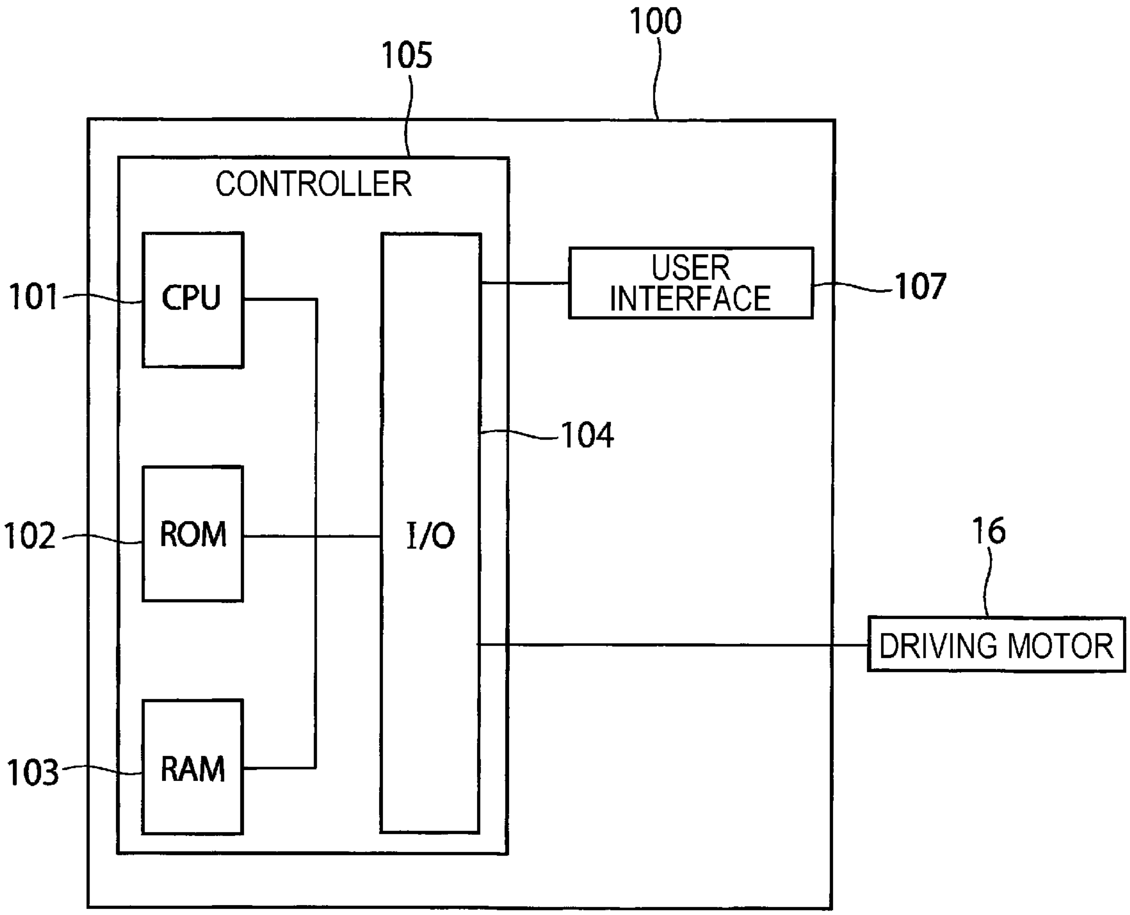
FIG. 10 is a block diagram of a control section included in the image forming apparatus according to the first exemplary embodiment of the present disclosure.

FIG. 10 is a block diagram of a control section 100 included in the image forming apparatus 1.

The control section 100 of the image forming apparatus 1 generally controls an image forming operation performed by the image forming apparatus 1. As illustrated in FIG. 10, the control section 100 includes a controller 105. The controller 105 includes a central processing unit (CPU) 101, a read-only memory (ROM) 102, a random access memory (RAM) 103, an input/output (I/O) interface 104, and so forth. The CPU 101 is an exemplary control unit (setting unit) that generally controls the image forming operation and is also an exemplary display control unit. The ROM 102 stores data such as programs to be executed by the CPU 101. The RAM 103 temporarily stores data such as parameters to be used by the CPU 101. The I/O interface 104 connects the CPU 101, the ROM 102, and other relevant elements to external elements.

The controller 105 of the control section 100 is connected to the user interface 107, which is an exemplary display (operation unit) through which the image forming apparatus 1 is operated. The user interface 107 is a liquid-crystal touch panel or the like.

When a command for starting a printing operation is issued by the user through the user interface 107 or the like, the controller 105 of the control section 100 executes an image forming operation and controls an operation of placing the recording sheet 5 having an image formed thereon onto the sheet placing tray 7. The controller 105 serves as a first detecting unit that detects the completion of the operation of placing the recording sheet 5.

The controller 105 of the control section 100 is connected to the driving motor 16.

Operation of Image Forming Apparatus

Referring to FIG. 10, in the image forming apparatus 1, when image information and a command requesting full-color image formation (printing) are received from the user interface 107 or any other device such as a personal computer (not illustrated), the controller 105 activates the image forming section 3, the sheet feeding section 4, and other relevant elements provided in the apparatus body 1*a*. The image forming section 3 includes the plurality of imaging devices that form toner images in yellow (Y), magenta (M), cyan (C), and black (K) by an electrophotographic method or the like; the intermediate transfer device that receives the toner images formed by the plurality of imaging devices and transports the toner images to the second-transfer position; and so forth. The sheet feeding section 4 feeds a recording sheet 5 to the image forming section 3.

In the image forming apparatus 1, a full-color or monochrome image is printed on a recording sheet 5 of a desired size or material with reference to printing information issued through the user interface 7 or any other device such as a personal computer (not illustrated), and the recording sheet 5 having the full-color or monochrome image formed thereon is outputted and placed onto the sheet placing tray 7 provided at the top of the apparatus body 1*a*.

Figure 11:
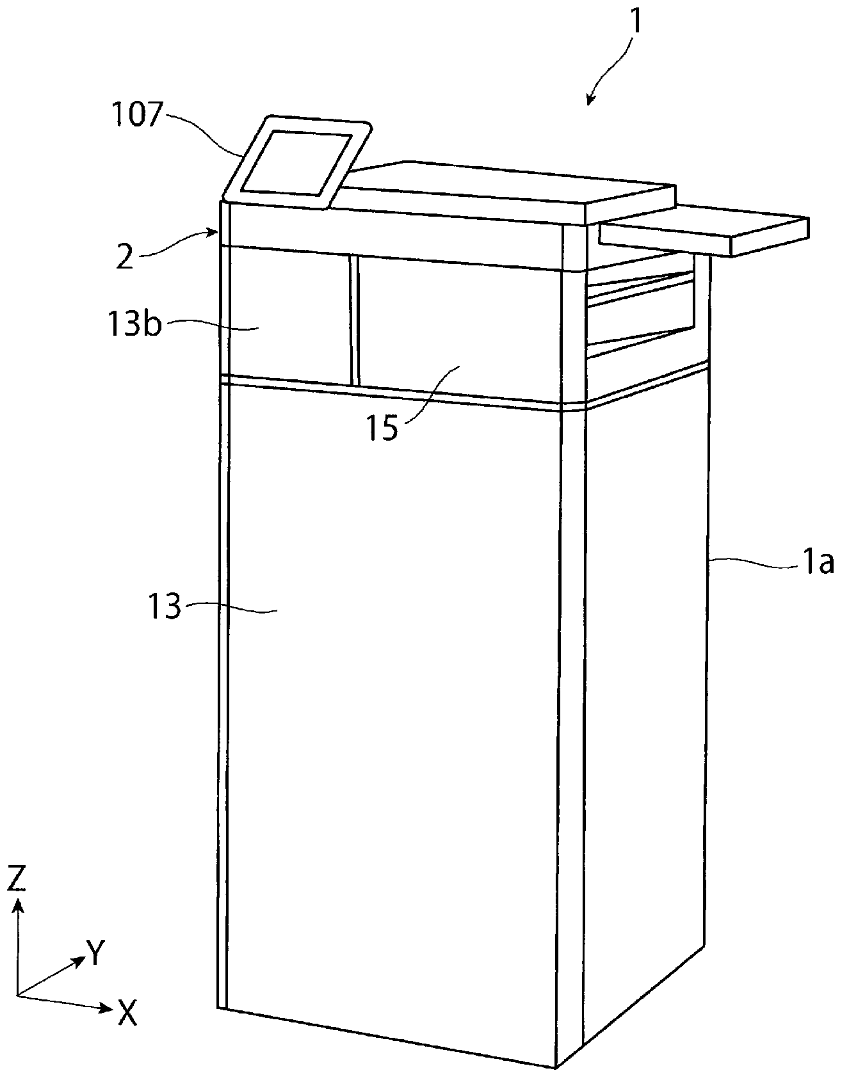
FIG. 11 is yet another perspective view of the image forming apparatus according to the first exemplary embodiment of the present disclosure, illustrating a state of operation thereof.

In the image forming apparatus 1 according to the first exemplary embodiment, when no image forming operation is underway, as illustrated in FIG. 11, the opening 8 at the front face of the sheet placing tray 7 is normally closed by the liftable covering 15 that is driven by the driving motor 16. Then, when an image forming operation is started, the liftable covering 15 is lowered. Alternatively, the driving motor 16 of the image forming apparatus 1 according to the first exemplary embodiment may be operated as follows, in accordance with the command issued by the controller 105 illustrated in FIG. 10. The opening 8 at the front face of the sheet placing tray 7 may be normally closed by the liftable covering 15 as illustrated in FIG. 11, even during the image forming operation. Then, when it is detected that any recording sheet 5 is placed onto the sheet placing tray 7, the liftable covering 15 may be lowered.

When it is detected by the controller 105 that the entire process of an image forming operation is complete, the controller 105 activates the driving motor 16 to lower the liftable covering 15 with the aid of the link 18, whereby the opening 8 of the sheet placing tray 7 is fully opened as illustrated in FIG. 1. When it is determined by the controller 105 that the front covering 13 is open, the controller 105 does not activate the liftable covering 15, so that the opening 8 of the sheet placing tray 7 is neither opened nor closed.

To summarize, when an image forming operation by the image forming apparatus 1 is complete, the liftable covering 15 is lowered to open the opening 8 of the sheet placing tray 7. Therefore, users are allowed to access the recording sheet 5 placed on the sheet placing tray 7 and pick up the recording sheet 5.

Second Exemplary Embodiment

Figure 12:
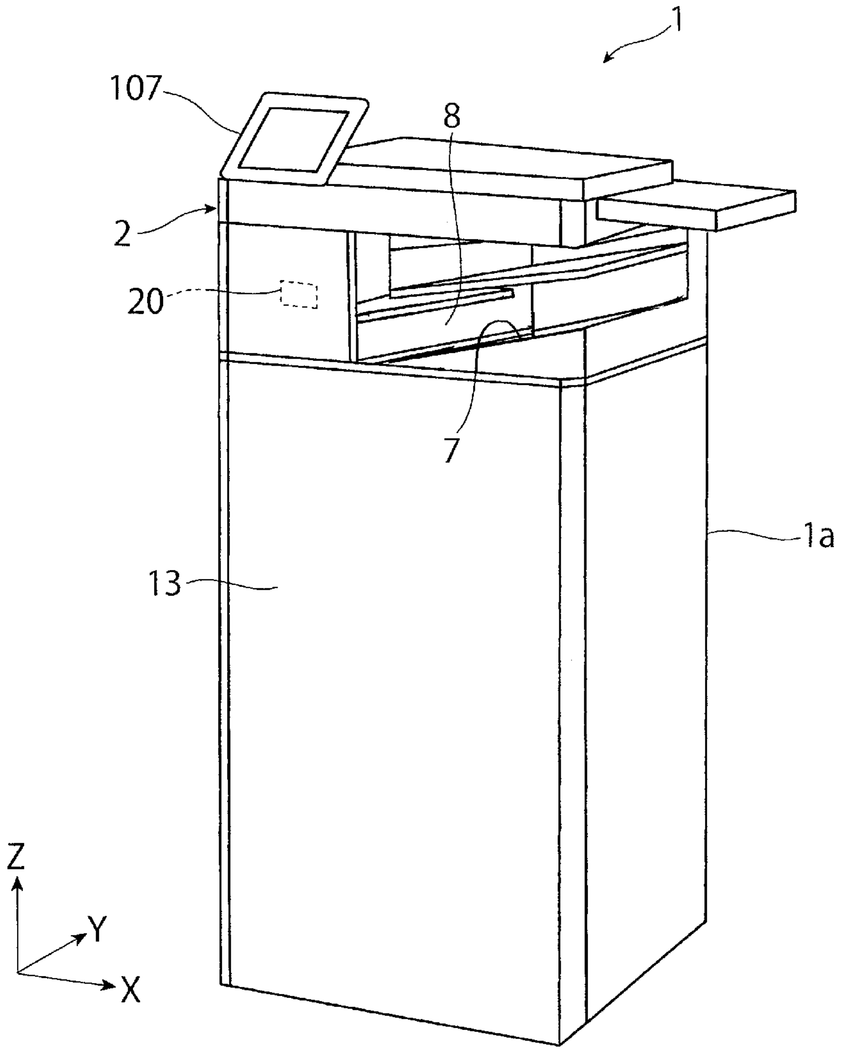
FIG. 12 is a perspective view of an image forming apparatus according to a second exemplary embodiment of the present disclosure, illustrating the appearance thereof.

FIG. 12 illustrates the outline of an image forming apparatus 1 according to a second exemplary embodiment of the present disclosure.

In the image forming apparatus 1 according to the second exemplary embodiment, the predetermined timing is set to a time point when a user approaching the apparatus body 1*a* to pick up the recording sheet 5 placed on the sheet placing tray 7 is detected.

The image forming apparatus 1 according to the second exemplary embodiment includes a second detecting unit that detects a user approaching the apparatus body 1*a*.

Specifically, as illustrated in FIG. 12, the image forming apparatus 1 according to the second exemplary embodiment includes a human sensor 20, which is an exemplary second detecting unit that detects a user approaching the apparatus body 1*a*. The human sensor 20 measures the distance to a user (an operator) who has approached the apparatus body 1*a* of the image forming apparatus 1 with infrared light or the like. The human sensor 20 does not necessarily need to measure the exact distance to the user (operator) approaching the apparatus body 1*a* of the image forming apparatus 1 and may be capable of detecting at least the presence of any user near the apparatus body 1*a*.

The human sensor 20 is provided on a sensor board. The sensor board is provided inside the second covering portion 13*b* of the front covering 13. The second covering portion 13*b* has an opening or a shield that allows light to pass through at the front face thereof. The human sensor 20 is, for example, a reflection sensor serving as an object sensor. The human sensor 20 emits light from a light emitter and receives the light reflected by a human body with a light receiver, thereby detecting a user approaching the apparatus body 1*a*. The human sensor 20 is not limited to the one including a light emitter and a light receiver and may be any other sensor, such as a sensor that detects the distance to a human body by using ultrasonic wave or the like.

Figure 13:
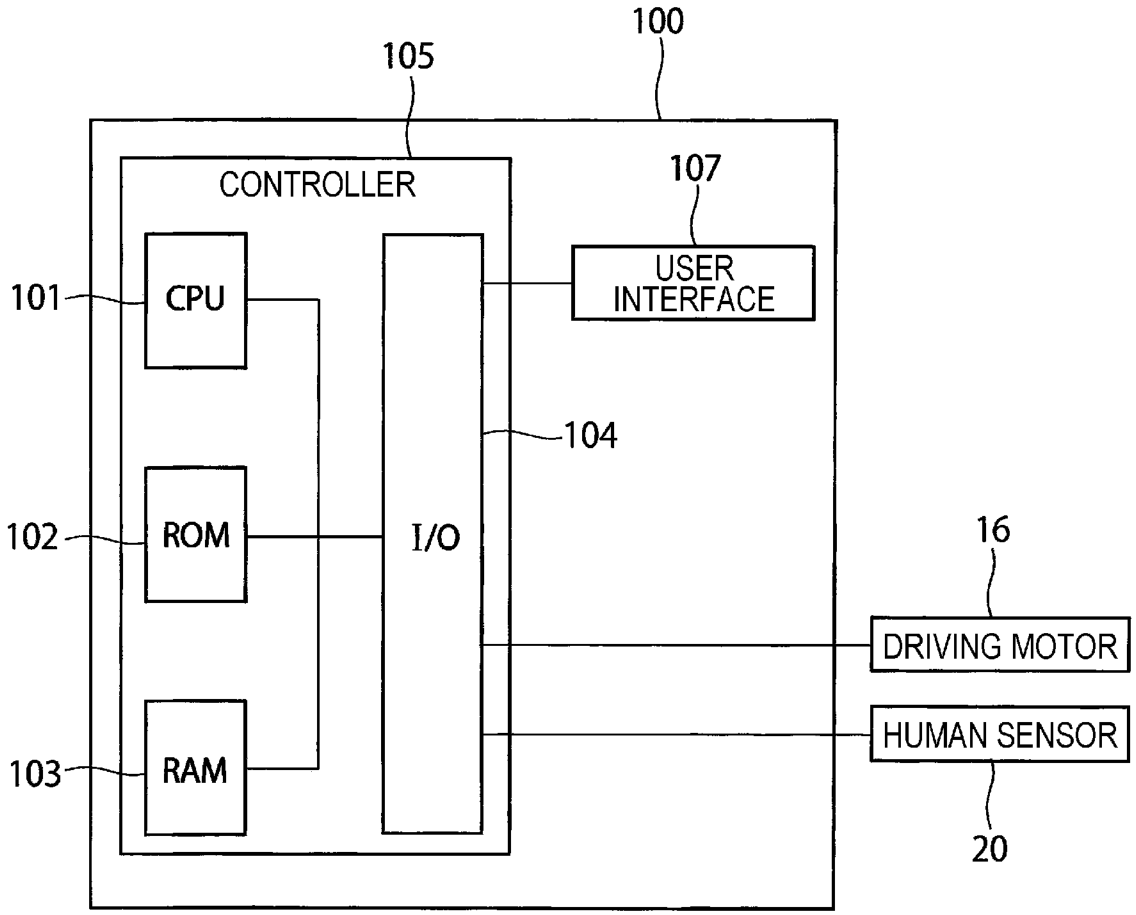
FIG. 13 is a block diagram of a control section included in the image forming apparatus according to the second exemplary embodiment of the present disclosure.

Referring to FIG. 13, the human sensor 20 transmits a detection signal to the controller 105 included in the control section 100 of the image forming apparatus 1. The controller 105 controls the driving motor 16 in accordance with the detection signal received from the human sensor 20.

Operation of Image Forming Apparatus

Referring to FIG. 13, in the image forming apparatus 1 according to the second exemplary embodiment, when image information and a command requesting full-color image formation (printing) are received from the user interface 107 or any other device such as a personal computer (not illustrated), the controller 105 activates the image forming section 3, the sheet feeding section 4, and other relevant elements provided in the apparatus body 1*a*. The image forming section 3 includes the plurality of imaging devices that form toner images in yellow (Y), magenta (M), cyan (C), and black (K) by an electrophotographic method or the like; the intermediate transfer device that receives the toner images formed by the plurality of imaging devices and transports the toner images to the second-transfer position; and so forth. The sheet feeding section 4 feeds a recording sheet 5 to the image forming section 3.

In the image forming apparatus 1, a full-color or monochrome image is printed on a recording sheet 5 of a desired size or material with reference to printing information issued through the user interface 7 or any other device such as a personal computer (not illustrated), and the recording sheet 5 having the full-color or monochrome image formed thereon is outputted and placed onto the sheet placing tray 7 provided at the top of the apparatus body 1*a*.

In the image forming apparatus 1 according to the second exemplary embodiment, when no image forming operation is underway, the opening 8 at the front face of the sheet placing tray 7 is normally closed by the liftable covering 15 that is driven by the driving motor 16. Then, when an image forming operation is started, the liftable covering 15 is lowered. Alternatively, the driving motor 16 of the image forming apparatus 1 according to the second exemplary embodiment may be operated as follows, in accordance with the command issued by the controller 105 illustrated in FIG. 13. The opening 8 at the front face of the sheet placing tray 7 may be normally closed by the liftable covering 15, even during the image forming operation. Then, when it is detected by the human sensor 20 that a user has approached the apparatus body 1*a*, the liftable covering 15 may be lowered.

When it is detected by the human sensor 20 that a user has approached the apparatus body 1*a* to pick up the recording sheet 5 placed onto the sheet placing tray 7, the controller 105 activates the driving motor 16 to lower the liftable covering 15 with the aid of the link 18, whereby the opening 8 of the sheet placing tray 7 is fully opened.

When it is detected by the human sensor 20 that the user has moved away from the apparatus body 1*a*, the controller 105 activates the driving motor 16 to lift the liftable covering 15 with the aid of the link 18, whereby the opening 8 of the sheet placing tray 7 is closed.

To summarize, when an image forming operation by the image forming apparatus 1 is complete, the liftable covering 15 is lowered to open the opening 8 of the sheet placing tray 7. Therefore, users are allowed to access the recording sheet 5 placed on the sheet placing tray 7 and pick up the recording sheet 5.

Furthermore, when it is detected by the human sensor 20 that a user is present near the apparatus body 1*a*, the controller 105 prohibits the closing of the opening 8 of the sheet placing tray 7, without activating the driving motor 16 to lift the liftable covering 15.

The other elements and functions thereof are the same as those of the first exemplary embodiment, and description of such elements is omitted.

Third Exemplary Embodiment

In an image forming apparatus 1 according to a third exemplary embodiment of the present disclosure, the predetermined timing is set to a time point when a command for executing the operation of forming an image on a recording medium 5 is received.

The image forming apparatus 1 according to the third exemplary embodiment of the present disclosure includes a display. When a user issues a command for an image forming operation through the display, the opening 8 is opened.

Specifically, the image forming apparatus 1 according to the third exemplary embodiment of the present disclosure includes the user interface 107, illustrated in FIG. 1. The user interface 107 is an exemplary display through which users operate the image forming apparatus 1. Through the user interface 107, users execute operations such as the reading of the image of a document by the image reading device 2, and the operation of forming an image on a recording sheet 5.

When the user interface 107 is operated and a command for the execution of the operation of forming an image on a recording sheet 5 is received by the controller 105, the controller 105 activates the driving motor 16 to lower the liftable covering 15, whereby the opening 8 of the sheet placing tray 7 is opened.

The other elements and functions thereof are the same as those of the first exemplary embodiment, and description of such elements is omitted.

While the above exemplary embodiments each concern a full-color image forming apparatus, the image forming apparatus is not limited thereto. Needless to say, the present disclosure is also applicable to a monochrome image forming apparatus.

While the above exemplary embodiments each concern an electrophotographic image forming apparatus, the image forming apparatus is not limited thereto. Needless to say, the image forming apparatus may be based on any recording method such as an inkjet method.

While the above exemplary embodiments each concern a case where the liftable covering 15 provided as an exemplary opening-closing member moves up and down in the vertical direction Z, the opening-closing member is not limited thereto. The opening-closing member may be a member that is movable in the horizontal direction to open and close the opening of the placing portion.

While the above exemplary embodiments each concern a case where the liftable covering 15 provided as an exemplary opening-closing member opens and closes only the opening 8 provided at the front face of the sheet placing tray 7, the liftable covering 15 is not limited thereto. The liftable covering 15 may open and close both of the openings 8 and 9 provided at the front face and the side face of the sheet placing tray 7.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:

a placing portion onto which a recording medium having an image formed is to be placed; and an opening-closing member that covers an opening provided at least at one side face of the placing portion and automatically opens the opening at a predetermined timing associated with a completion of an image forming operation being performed on the recording medium, wherein the predetermined timing comprises a time point after the image forming operation has been performed on the recording medium and when a user approaching an apparatus body to pick up the recording medium placed on the placing portion is detected by a human sensor.

2. The image forming apparatus according to claim 1, wherein the opening-closing member opens and closes the opening by moving up and down with an aid of a link mechanism that is driven by a drive source.

3. The image forming apparatus according to claim 2, wherein the drive source is provided to an apparatus body, wherein the opening-closing member is provided to an openable covering that covers the apparatus body, and wherein the drive source transmits a driving force to the opening-closing member through a pair of driving-force-transmitting members that are capable of coming into and going out of mesh with each other.

4. The image forming apparatus according to claim 1, wherein the predetermined timing further comprises a time point when the image forming operation performed on the recording medium and an operation of placing the recording medium onto the placing portion are complete.

5. The image forming apparatus according to claim 4, further comprising:

a first detecting unit that detects the completion of the operation of placing the recording medium.

6. The image forming apparatus according to claim 1, further comprising:

a second detecting unit that detects a distance between the apparatus body and the user.

7. The image forming apparatus according to claim 1, wherein the predetermined timing further comprises a time point when a command for executing an operation of forming an image on the recording medium is received.

8. The image forming apparatus according to claim 7, further comprising:

a display, wherein the opening is opened when the command for executing the operation of forming an image is issued by a user through the display.

9. The image forming apparatus according to claim 1, further comprising:

an openable covering that covers an apparatus body, wherein the opening-closing member is not activated when the covering is open.

10. The image forming apparatus according to claim 9, wherein the openable covering serves as a front covering to which the opening-closing member is provided.

11. The image forming apparatus according to claim 1, wherein the placing portion is provided inside a frame of an apparatus body.

12. The image forming apparatus according to claim 2, wherein the placing portion is provided inside a frame of an apparatus body.

13. The image forming apparatus according to claim 3, wherein the placing portion is provided inside a frame of an apparatus body.

14. The image forming apparatus according to claim 4, wherein the placing portion is provided inside a frame of an apparatus body.

15. The image forming apparatus according to claim 5, wherein the placing portion is provided inside a frame of an apparatus body.

16. The image forming apparatus according to claim 6, wherein the placing portion is provided inside a frame of an apparatus body.

17. The image forming apparatus according to claim 7, wherein the placing portion is provided inside a frame of an apparatus body.

18. The image forming apparatus according to claim 1, wherein the opening of the placing portion is provided at a front face of an apparatus body, the front face facing a user when the user operates the image forming apparatus.

* * * * *